US 8,718,276 B2

(12) United States Patent
Icart et al.

(10) Patent No.: US 8,718,276 B2
(45) Date of Patent: *May 6, 2014

(54) CRYPTOGRAPHY ON A ELLIPTICAL CURVE

(75) Inventors: Thomas Icart, Paris (FR);
Jean-Sebastien Coron, Asnieres (FR)

(73) Assignee: Morpho, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/377,404

(22) PCT Filed: Jun. 15, 2010

(86) PCT No.: PCT/FR2010/051190
§ 371 (c)(1),
(2), (4) Date: Dec. 9, 2011

(87) PCT Pub. No.: WO2010/146302
PCT Pub. Date: Dec. 23, 2010

(65) Prior Publication Data
US 2012/0082307 A1  Apr. 5, 2012

(30) Foreign Application Priority Data

Jun. 16, 2009 (FR) ..................... 09 54053

(51) Int. Cl.
*H04K 1/00* (2006.01)
*H04L 9/00* (2006.01)
*H04L 9/28* (2006.01)
*H04L 9/30* (2006.01)

(52) U.S. Cl.
USPC ................................. 380/28; 380/30; 380/44

(58) Field of Classification Search
CPC ........................................... G06F 7/725
USPC ........................................................ 380/28
See application file for complete search history.

(56) References Cited

U.S. PATENT DOCUMENTS 8,225,109 B1 * 7/2012 Kalligudd ..................... 713/193
2001/0002486 A1 * 5/2001 Kocher et al. ................. 713/171
(Continued)

FOREIGN PATENT DOCUMENTS

WO        WO-0005837 A1      2/2000

OTHER PUBLICATIONS

Andrew Shallue and Christiaan van de Woestijne, Construction of rational points on elliptic curves over Finite Fields, 2006, vol. 4076 of Lecture Notes in Computer Science, pp. 510-524.*
Ulas, Maciej: "Rational Points on Certain Hyperelliptic Curves Over Finite Fields," Jun. 11, 2007 (9 pages).

(Continued)

*Primary Examiner* — Andrew Nalven
*Assistant Examiner* — Khang Do
(74) *Attorney, Agent, or Firm* — Gardere Wynne Sewell LLP; Andre M. Szuwalski

(57) ABSTRACT

A cryptographic calculation includes obtaining a point $P(X, Y)$ from a parameter t on an elliptical curve $Y^2=f(X)$; and from polynomials $X_1(t)$, $X_2(t)$, $X_3(t)$ and $U(t)$ satisfying: $f(X_1(t)) \cdot f(X_2(t)) \cdot f(X_3(t)) = U(t)^2$ in Fq, with q=3 mod 4. Firstly a value of the parameter t is obtained. Next, the point P is determined by: (i) calculating $X_1=X_1(t)$, $X_2=X_2(t)$, $X_3=X_3(t)$ and $U=U(t)$; (ii) if the term $f(X_1) \cdot f(X_2)$ is a square, then testing whether the term $f(X_3)$ is a square in $F_q$ and if so calculating the square root of $f(X_3)$ in order to obtain the point $P(X_3)$; (iii) otherwise, testing whether the term $f(X_1)$ is a square and, if so, calculating the square root of $f(X_1)$ in order to obtain the point $P(X_1)$; (iv) otherwise, calculating the square root of $f(X_2)$ in order to obtain the point $P(X_2)$. This point P is useful in a cryptographic application.

13 Claims, 3 Drawing Sheets

(56) References Cited

U.S. PATENT DOCUMENTS

| | | | |
|---|---|---|---|
| 2003/0059042 A1* | 3/2003 | Okeya et al. | 380/30 |
| 2004/0252834 A1* | 12/2004 | Nishimura et al. | 380/201 |
| 2008/0170695 A1* | 7/2008 | Adler et al. | 380/277 |
| 2010/0293379 A1* | 11/2010 | Nie | 713/169 |

OTHER PUBLICATIONS

PCT Search Report for PCT/FR2010/051190 mailed Jan. 17, 2011 (6 pages).

Shallue A et al: "Construction of rational points on elliptic curves over finite fields", In Computer Science vol. 4076, Springer-Verlag Berlin, Germany, Jan. 1, 2006, pp. 510-524.

* cited by examiner

CRYPTOGRAPHY ON A ELLIPTICAL CURVE

PRIORITY CLAIM

This application is a 371 filing from PCT/FR2010/051190 (published as WO 2010/146302) filed Jun. 15, 2010 which claims the benefit of French Application for Patent No. 09-54053 filed Jun. 16, 2009, the disclosures of which are hereby incorporated by reference.

TECHNICAL FIELD

The present invention relates to message cryptography based on the use of points on an elliptical curve, and more particularly said cryptography of a deterministic nature.

BACKGROUND

In order to apply a cryptographic calculation to a message, conventionally algorithms are employed for inserting arbitrary values into mathematical structures. For this purpose, the elliptical curves are mathematical structures that are able to facilitate the application of such cryptographic calculations and at the same time save space in memory relative to the use of other cryptographic calculations.

However, efficient algorithms for inserting arbitrary values using elliptical curves are probabilistic. Consequently, the application time of these algorithms is not constant, it depends on the message to be encoded. Thus, if an attacker determines different application times of the algorithm applied, he can obtain information about the coded message.

In order to mask the time taken by a probabilistic insertion algorithm, it is possible to provide the addition of unnecessary steps in this algorithm so that its application always extends over a period of time of identical length, regardless of the message processed.

A point P of an elliptical curve is defined by its abscissa X and its ordinate Y, X and Y satisfying the following equation:

$$f(X)=Y^2 \quad (1)$$

where $f(X)$ is the polynomial $f(X)=X^3+aX+b$

A family of polynomials is known, which satisfy Skalba's equality which makes it possible to determine such a point on an elliptical curve, as defined in the document 'Construction of Rational Points on Elliptic curves over finite fields' by Andrew Shallue and Christiaan van de Woestijne.

Polynomials $X_1(t)$, $X_2(t)$, $X_3(t)$ and $U(t)$ satisfy Skalba's equality if they satisfy the following equation:

$$f(X_1(t)) \cdot f(X_2(t)) \cdot f(X_3(t))=U^2(t) \quad (2)$$

where f is the function that defines the elliptical curve under consideration, and
where t is a parameter.

The polynomials that satisfy Skalba's equality can take two parameters u and t. In this case, Skalba's equality is written:

$$f(X_1(t,u)) \cdot f(X_2(t,u)) \cdot f(X_3(t,u))=U^2(t,u)$$

Equations of this type can be used with two parameters u and t. However, in the proposed applications, we can advantageously envisage setting u, or alternatively setting t, at any value. Thus, the value of a single parameter remains to be chosen.

Given selected parameters t and u, it is noted that $X_1=X_1(t,u)$, $X_2=X_2(t,u)$, $X_3=X_3(t,u)$, $U=U(t,u)$, where $X_1$, $X_2$, $X_3$ and $U$ are elements of $F_q$. This equation (2) signifies that at least one of the values $f(X_1)$, $f(X_2)$ and $f(X_3)$ corresponds to a squared term in the finite field $F_q$.

Then, once the squared term in $F_q$, $f(X_i)$, is identified, we can then obtain a point on the elliptical curve $P(X_i, \sqrt{f(X_i)})$.

Calculation of $\sqrt{f(X_i)}$ can be performed by means of an exponentiation calculation when the characteristic q of the field $F_q$ satisfies:

$$q=3 \bmod 4$$

In this case, it is known that:

$$\sqrt{f(X_i)}=f(X_i)^{(q+1)/4} \quad (3)$$

In order to determine a point on the elliptical curve (1), it is therefore necessary to determine which value among the three values $f(X_1)$, $f(X_2)$ and $f(X_3)$ corresponds to a squared term in the finite field $F_q$. For this purpose we could envisage checking firstly whether the term $f(X_1)$ is a squared term in the finite field $F_q$, then, if it is not the case, apply this same check to the term $f(X_2)$, and finally if this is still not so, check the term $f(X_3)$ similarly. However, following this procedure, determination of a point on the elliptical curve does not always take the same time, since this determination is executed more quickly if the first term tested is a squared term than if only the third term is a squared term.

A potential attacker could make use of this difference in elapsed time to determine a point on the elliptical curve for breaking the secret linked to the parameter that enabled this point to be generated. Now, in the field of cryptography, these parameters must remain secret.

These parameters can in particular correspond to passwords. Thus, it is important that determination of these points does not in itself supply information that makes it possible to break the secret of the parameter, and accordingly, attacks based on an analysis of the elapsed time for determining a point on the curve are to be avoided.

To overcome this disadvantage, it would be possible to check the three terms $f(X_i)$ systematically for i in the range from 1 to 3. Thus, the time for determining a point on the curve would no longer be a function of the point determined.

However, checking whether a term of equation (2) is a squared term in the finite field $F_q$ is a complex operation in particular employing an exponentiation, which is costly in execution time. In the case when we wish to determine a point on an elliptical curve on the basis of Skalba's equalities, while performing these determinations in a constant time, four operations of exponentiation are required in the case described above, one exponentiation per check of each of the terms of Skalba's equation (2) and one exponentiation for calculating the square root, as described in equation (3).

The present invention aims to improve this situation.

SUMMARY

A first aspect of the present invention proposes a method of execution of a cryptographic calculation in an electronic component comprising a step of obtaining a point P(X,Y) starting from at least one parameter t, on an elliptical curve satisfying the equation:

$$Y^2=f(X); \text{ and}$$

starting from polynomials $X_1(t)$, $X_2(t)$, $X_3(t)$ and $U(t)$ satisfying Skalba's equality:

$$f(X_1(t)) \cdot f(X_2(t)) \cdot f(X_3(t))=U(t)^2$$

in the finite field $F_q$, regardless of the parameter t, q satisfying the equation $q=3 \bmod 4$;

said method comprising the following steps:
/1/ obtain a value of the parameter t;
/2/ determine point P by executing the following substeps:
  /i/ calculate $X_1=X_1(t)$, $X_2=X_2(t)$, $X_3=X_3(t)$ and $U=U(t)$
  /ii/ if the term $f(X_1) \cdot f(X_2)$ is a squared term in the finite field $F_q$ then test whether the term $f(X_3)$ is a squared term in the finite field $F_q$ and calculate the square root of the term $f(X_3)$, point P having $X_3$ as abscissa and the square root of the term $f(X_3)$ as ordinate;
  /iii/ otherwise, test whether the term $f(X_1)$ is a squared term in the finite field $F_q$ and in this case, calculate the square root of the term $f(X_1)$, point P having $X_1$ as abscissa and the square root of the term $f(X_1)$ as ordinate;
  /iv/ otherwise, calculate the square root of the term $f(X_2)$, point P having $X_2$ as abscissa and the square root of the term $f(X_2)$ as ordinate;
/3/ use said point P in a cryptographic application of encryption or hashing or signature or authentication or identification.

Thanks to these arrangements, it is possible to determine a point on an elliptical curve in a manner suitable for use in the field of cryptography, since on the one hand this determination takes the same time regardless of the input parameter t and on the other hand it is efficient as the number of demanding operations is reduced.

This determination takes a constant time that does not depend on the input parameter or parameters. In fact, even if this method offers different processing options depending on the term that corresponds to a squared term in Skalba's equality, the same number of operations of the same type is performed regardless of the point on the curve that is determined. More precisely, regardless of the point on the curve that is determined, the following list of operations is executed:
test for a squared term in $F_q$;
determination of a square root.

Therefore it is not possible to launch an attack of the 'timing attack' type.

Moreover, this determination is efficient since the number of costly operations employed is limited. In fact, it is possible to check whether one of the three terms of Skalba's equation (2) is a squared term in the finite field $F_q$, by using at most two operations of the exponentiation type. More precisely, it should be noted that, in one embodiment of the present invention, the test for a squared term corresponds to an exponentiation, which is the most demanding operation to be employed in the present context.

At step /2/-/ii/, it is necessary to decide whether the term $R_0$:

$$R_0 = f(X_1) \cdot f(X_2)$$

is a squared term.

This step can correspond to a test for a squared term, which employs an additional exponentiation, or it can be based on a pre-calculated value obtained from an earlier calculation in the case when a polynomial satisfying Skalba's equality corresponds to a term that can never be a squared term. In the latter case, which is presented in the following sections, application of a method advantageously requires just one exponentiation. But in the worst case, application of a method according to one embodiment of the present invention corresponds to two exponentiations, one for the test for a squared term applied to $R_0$, and another exponentiation for the test for a squared term applied either to $f(X_3)$ or to $f(X_1)$.

During execution of such calculations according to one embodiment of the present invention, the time taken for carrying out the operations other than an exponentiation is negligible relative to the time taken by the application of an exponentiation. Now, owing to the characteristics of the present invention, instead of four exponentiations, as described previously in a conventional case, two exponentiations are required at most. Such a reduction in the number of exponentiations is very advantageous.

In one embodiment of the present invention, at step /2/-/ii/, the following steps are executed:
calculate $R_1$ such that:

$$R_1 = (f(X_1) \cdot f(X_2))^{\frac{q+1}{4}}$$

if $R_1^2$ is equal to $f(X_1) \cdot f(X_2)$, then decide that the term $f(X_1) \cdot f(X_2)$ is a squared term in field $F_q$;

At step /2/-/iii/, it is tested whether the term $f(X_1)$ is a squared term in the finite field $F_q$ according to the following steps:
calculate $R'_2$ such that:

$$R'_2 = f(X_1)^{q-1-\frac{q+1}{4}}$$

calculate $R'_3$ such that:

$$R'_3 = R'_2{}^2$$

calculate $R'_4$ such that:

$$R'_4 = R'_3 \cdot f(X_1)$$

if $R'_4$ is not equal to 1, at step /2/-/iv/, the square root of $f(X_2)$ is obtained according to the following equation:

$$\sqrt{f(X_2)} = R_1 \cdot R'_2$$

This embodiment is general and can easily be applied to the whole family of polynomials that satisfy Skalba's equality. It should be noted that, ingeniously, in the case when the squared term in Skalba's equality (2) is $f(X_2)$, i.e. the last term to be checked of the three terms of Skalba's equality, it is not necessary to perform a new exponentiation of the type $$f(X_1)^{q-1-\frac{q+1}{4}}.$$

In fact, the term $R'_2$ can be used advantageously to obtain the square root of the term $f(X_2)$. It is thus guaranteed that only two exponentiations at most are employed during execution of a method according to one embodiment of the present invention.

In one embodiment of the present invention, the polynomials satisfying Skalba's equation in X and Y are expressed in Jacobian coordinates in X', Y' and Z such that:

$$X' = X \cdot Z^2,$$

$$Y' = Y \cdot Z^3$$

and the operations of inversion are transformed into operations of multiplication.

The transformation into Jacobian coordinates makes it possible to transform the inversions into multiplications, when the term Z is correctly selected.

In one embodiment of the present invention, the polynomials that satisfy Skalba's equality are expressed in Jacobian coordinates, according to which the point P(X,Y) is written P(X',Y',Z) such that:

$$X'=X\cdot Z^2,$$

$$Y'=Y\cdot Z^3$$

where the function f is written $f_z(X')$ and satisfies:

$$f_z(X')=X'^3+a\cdot X'\cdot Z^4+b\cdot Z^6$$

with the elliptical curve satisfying the equation:

$$Y'^2=f_z(X')$$

and the polynomials satisfying Skalba's equality expressed in Jacobian coordinates are $X'_1(t)$, $X'_2(t)$, $X'_3(t)$, $Z(t)$ and $U'(t)$ and satisfy Skalba's equality in Jacobian coordinates:

$$U'(t)^2=f_{Z(t)}(X'_1(t))\cdot f_{Z(t)}(X'_2(t))\cdot f_{Z(t)}(X'_3(t))$$

with Z(t) determined in such a way that the operations of inversion are transformed into operations of multiplication.

Here it is a question of applying a transformation in Jacobian coordinates to the Ulas polynomials satisfying Skalba's equality, as stated previously. In this case, it is possible to limit the number of exponentiations to two, and at the same time eliminate any calculation of inversion, while ensuring execution in a constant time of a determination of a point P on the elliptical curve.

In one embodiment, the polynomials that satisfy Skalba's equality are such that it is possible to set the value of $X_3(t)$ for any possible t, such that $f(X_3(t))$ is never a squared term in $F_q$, in which, at step /2/-/ii/, the term $f(X_1)\cdot f(X_2)$ is not a squared term in the finite field $F_q$, in which, at step /2/-/iii/, it is tested whether the term $f(X_1)$ is a squared term in the finite field $F_q$ according to the following steps:

calculate $R'_2$ such that:

$$R'_2 = f(X_1)^{q-1-\frac{q+1}{4}}$$

calculate $R'_3$ such that:

$$R'_3=R'_2{}^2$$

calculate $R'_4$ such that:

$$R'_4=R'_3\cdot f(X_1)$$

in which, if $R'_4$ is not equal to 1, at step /2/-/iv/, the square root of $f(X_2)$ is obtained according to the following equation:

$$\sqrt{f(X_2)} = R_1 \cdot R'_2$$

$$\text{where } R_1 = (f(X_1)\cdot f(X_2))^{\frac{q+1}{4}}$$

in which $R_1$ is obtained beforehand from the following equation:

$$R_1 = (f(X)\cdot f(X_2))^{\frac{q+1}{4}} = U \cdot f(u)^{q-1-\frac{q+1}{4}}$$

Thus, in a particular case, it is possible to limit the number of exponentiations to be performed even further by using a particular family of polynomials, such that it is possible to set the value of $X_3(t)$ for any possible t, such that $f(X_3(t))$ is never a squared term in $F_q$. The family of Ulas polynomials as described in the document 'Rational points on certain hyper-elliptical curves over finite fields' by Macie Ulas, dated 11 Jun. 2007 can advantageously be used here.

For such a family of polynomials that satisfy Skalba's equality, we can write:

$$X_1(t, u) = -\frac{b}{a}\left(1 + \frac{1}{t^4 f(u) + t^2 f(u)}\right)$$

$$X_2(t, u) = t^2 f(u) X_1(t, u)$$

$$X_3(t, u) = u$$

$$U(t, u) = t^3 f(u)^4 f(X_1(t, u))$$

where $f(u)=u^3+au+b$ where a and b are elements of $F_q$ such that their product is not zero.

These polynomials can be used advantageously in determining a set value of the parameter u such that $f(X_3)=f(u)$ is not a squared term in $F_q$.

Thus, at step /2/-/ii/, the term $f(X_1)\cdot f(X_2)$ is not a squared term in the finite field $F_q$, then, at step /1/-/iii/, it is tested whether the term $f(X_1)$ is a squared term in the finite field $F_q$ according to the following steps:

calculate $R'_2$ such that:

$$R'_2 = f(X_1)^{q-1-\frac{q+1}{4}}$$

calculate $R'_3$ such that:

$$R'_3=R'_2{}^2$$

calculate $R'_4$ such that:

$$R'_4=R'_3\cdot f(X_1)$$

Then, if $R'_4$ is not equal to 1, at step /1/-/iv/, the square root of $f(X_2)$ is obtained according to the following equation:

$$\sqrt{f(X_2)} = R_1 \cdot R'_2$$

$$\text{where } R_1 = (f(X_1)\cdot f(X_2))^{\frac{q+1}{4}}$$

$R_1$ can advantageously be obtained beforehand according to the following equation:

$$R_1 = (f(X)\cdot f(X_2))^{\frac{q+1}{4}} = U \cdot f(u)^{q-1-\frac{q+1}{4}}$$

In particular, the term $$f(u)^{q-1-\frac{q+1}{4}}$$

can be calculated in advance. This is possible as f(u) is also calculated in advance. In this particular case of polynomials that satisfy Skalba's equality, it is therefore possible not to have to perform the exponentiation relating to the calculation of $$(f(X_1(t))\cdot f(X_2(t)))^{\frac{q+1}{4}}$$

during application of the method, but just the multiplication $$U(t) \cdot (f(u))^{q-1-\frac{q+1}{4}}.$$

Thus, application of such a method then corresponds to a single exponentiation, that of the calculation of $$R'_2 = f(X_1)^{q-1-\frac{q+1}{4}}.$$

In this context, these particular polynomials are expressed in Jacobian coordinates according to which the point $P(X,Y)$ is written $P(X',Y',Z)$ such that:

$X'=X \cdot Z^2$, $Y'=Y \cdot Z^3$ where the function f is written $f_z(X')$ and satisfies:

$f_z(X')=X'^3+a \cdot X' \cdot Z^4+b \cdot Z^6$ with the elliptical curve satisfying the equation:

$Y'^2=f_Z(X')$ where the polynomials that satisfy Skalba's equality expressed in Jacobian coordinates are $X'_1(t)$, $X'_2(t)$, $Z(t)$ and $U'(t)$ and satisfy Skalba's equality in Jacobian coordinates:

$U'(t)^2=f_{Z(t)}(X'_1(t)) \cdot f_{Z(t)}(X'_2(t)) \cdot f(X_3(t))$ and where $Z(t)$ is determined in such a way that the operations of inversion are transformed into operations of multiplication.

At step /1/, the value of the parameter t can be obtained as a function of a password or an identifier. It is thus possible to envisage using the password directly or a derivative of the password as parameter.

In one embodiment of the present invention, the cryptographic application is an application of authentication or identification by a checking entity, and at step /1/, the following steps are executed:

/a/ generate a random value;

/b/ obtain an encrypted value by encrypting said random value based on an encryption function using an encryption key determined from a password or identifier corresponding to the parameter; and /c/ transmit the encrypted value to the checking entity.

By following this procedure, the checking entity is able to obtain the random value as a function of the encrypted value received from the password. Then it recovers the value of the parameter t by applying a suitable function.

A second aspect of the present invention proposes an electronic device comprising suitable means for applying a method of execution of a cryptographic calculation according to the first aspect of the present invention.

Other aspects, aims and advantages of the invention will become clear on reading the description of one of its embodiments.

BRIEF DESCRIPTION OF THE DRAWINGS

The invention will also be better understood with the aid of the following figures.

DETAILED DESCRIPTION OF THE DRAWINGS

Figure 1:
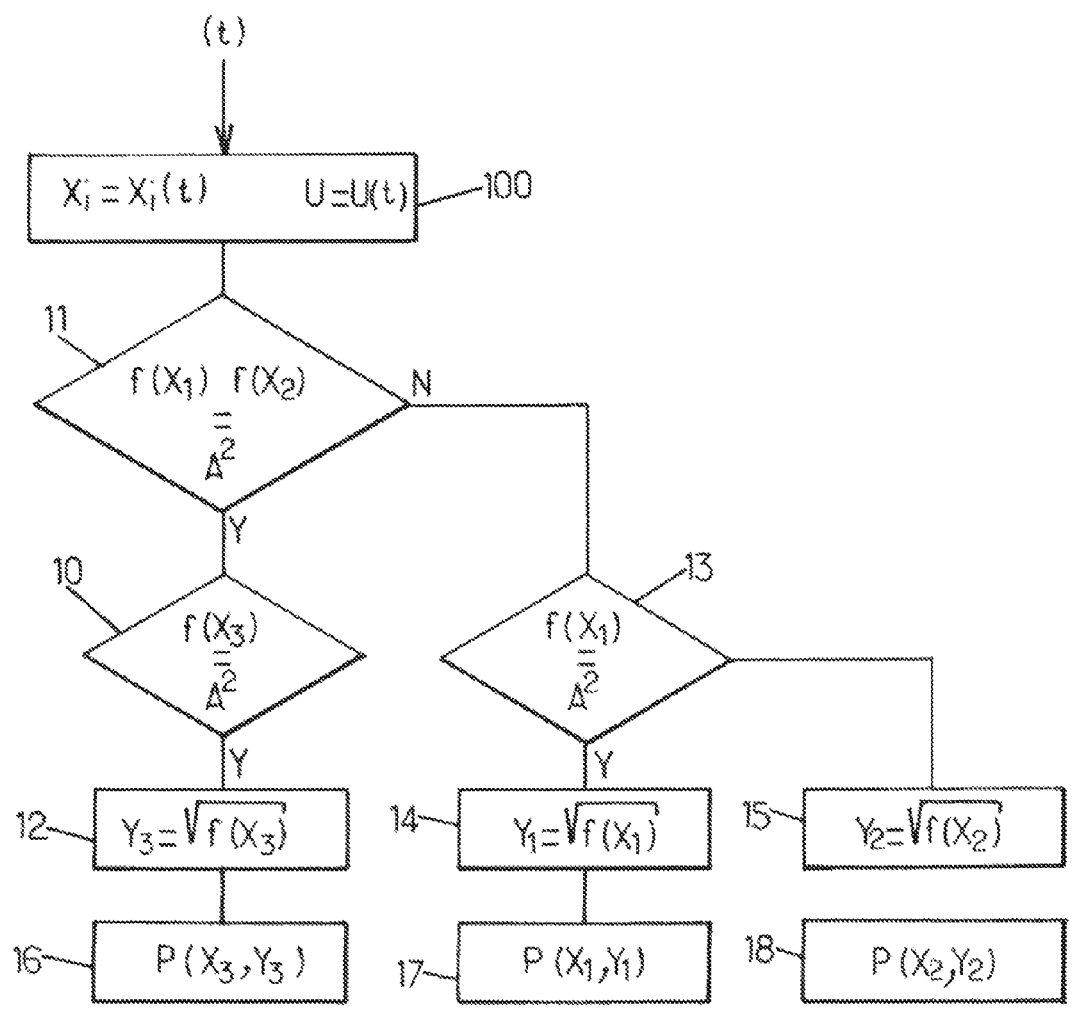
FIG. 1 shows the main steps of a method of execution of a cryptographic calculation according to one embodiment of the present invention.

FIG. 1 shows the main steps of a method of execution of a calculation according to one embodiment of the present invention.

These main steps are suitable for determining a point on an elliptical curve with the aim of using said point in a cryptographic application. A cryptographic calculation of this kind can be executed in an electronic component in a secure manner, i.e. without the determination of this point giving any information on the point determined.

This calculation comprises, in a finite field $F_q$, where q is equal to 3 mod 4, a step of obtaining a point $P(X,Y)$ on an elliptical curve satisfying the equation:

$Y^2=f(X)$

A point $P(X,Y)$ has its abscissa X which corresponds to one of $X_1(t)$, $X_2(t)$ and $X_3(t)$, for a value of t obtained, such that:

$$f(X_1(t)) \cdot f(X_2(t)) \cdot f(X_3(t))=U^2(t) \qquad (2)$$

where $X_1(t)$, $X_2(t)$, $X_3(t)$ and $U(t)$ are polynomials satisfying Skalba's equation in the finite field $F_q$.

More precisely, the polynomials that satisfy Skalba's equality, as defined in the document 'Rational points on certain hyperelliptic curves over finite fields' by Maciej Ulas, dated 11 Jun. 2007 are functions of two parameters u and t. In the context of the present invention, one of the parameters can advantageously be set and consequently the polynomials satisfying Skalba's equation are then functions of a single parameter t.

In order to determine a point on the curve, we try to determine, for given input parameters u and t, those among the values $X_1=X_1(t,u)$, $X_2=X_2(t,u)$, $X_3=X_3(t,u)$ that correspond to a squared term in the finite field $F_q$. For this purpose, application of two different processings is advantageously envisaged depending on whether or not the term $f(X_1) \cdot f(X_2)$ is a squared term in the finite field $F_q$.

At an initial step 100, the parameter t is taken into account and we calculate:

$X_i=X_i(t)$ for $i$ between 1 and 3, and $U=U(t)$

At a step 11, we decide whether this product $f(X_1) \cdot f(X_2)$ is a squared term. This decision can be based on previous calculations or can be based on a check during application of the method. If the term $f(X_1) \cdot f(X_2)$ is a squared term then the term $f(X_3)$ is also a squared term. In this case it is envisaged to calculate the square root of the term $f(X_3)$, at a step 12. At a step 16, the point P thus determined has $X_3$ as abscissa and $Y_3$ as ordinate satisfying the following equation:

$Y_3=\sqrt{f(X_3)}$

It should be noted that if the product $f(X_1) \cdot f(X_2)$ is a squared term, it follows that the term $f(X_3)$ is also a squared term. However, in order to keep determination of a point on the elliptical curve to a constant time, application of a test 10 is envisaged, so as to check that the term $f(X_3)$ is actually a squared term. This test 10 makes it possible to guarantee application of the method according to one embodiment of the present invention in a constant time.

In the other case, i.e. when the term $f(X_1) \cdot f(X_2)$ is not a squared term, we can deduce from this that either $f(X_1)$, or $f(X_2)$ is a squared term. We can therefore envisage checking, firstly, whether the term $f(X_1)$ is a squared term at a step 13. If the test is positive, its square root is then calculated at a step 14 in order to obtain the abscissa of the point P:

$$Y_1 = \sqrt{f(X_1)}$$

At a step 17, we then obtain the point P which has $X_1$ as ordinate and $Y_1$ as abscissa.

If the test at step 13 is negative, it can then be deduced from this that the term $f(X_2)$ is a squared term. Consequently, at a step 15 we obtain the abscissa $Y_2$ of a point P on the elliptical curve according to the equation:

$$Y_2 = \sqrt{f(X_2)}$$

A point $P(X_2, Y_2)$ of the curve can thus be supplied at a step 18.

It should be noted that reaching steps 16, 17 or 18 for obtaining a point on the elliptical curve according to one embodiment of the present invention requires similar operations. Thus, regardless of the input parameters t and u, it is not possible to launch an attack on the basis of the time elapsed.

The point $P(X_i, Y_i)$, for an i between 1 and 3, can then be used advantageously in a cryptographic application of encryption or hashing or signature or authentication or identification, since its determination has not supplied any element that can break its secret.

In the field $F_q$, q corresponding to 3 mod 4, it is possible to check whether a term is a squared term in various ways. The tests for a squared term such as tests 10 and 13 in FIG. 1 can be performed as follows.

In one embodiment of the present invention, when trying to determine whether a term A is a squared term in $F_q$, the following steps can be executed:

$$W_1 = \frac{1}{A^{\frac{q+1}{4}}} = A^{q-1-\frac{q+1}{4}} \quad \text{(i)}$$

$$W_2 = W_1^2 \quad \text{(ii)}$$

$$W_3 = W_2 \cdot A \quad \text{(iii)}$$

Finally, if term A is a squared term then:
$W_1$ corresponds to the reciprocal of the square root of A, i.e. $1/\sqrt{A}$, since an exponentiation at (q−1) corresponds to an inversion and an exponentiation at (q+1)/4 corresponds to a square root in the finite field $F_q$;
$W_2$ corresponds to the inverse of A; and
$W_3$ corresponds to the value 1.

Thus, when $W_3$ is equal to the value 1, it is concluded from this that the term A is a squared term in the finite field $F_q$. If A is not a squared term then $W_3$ is not equal to 1.

Figure 2:
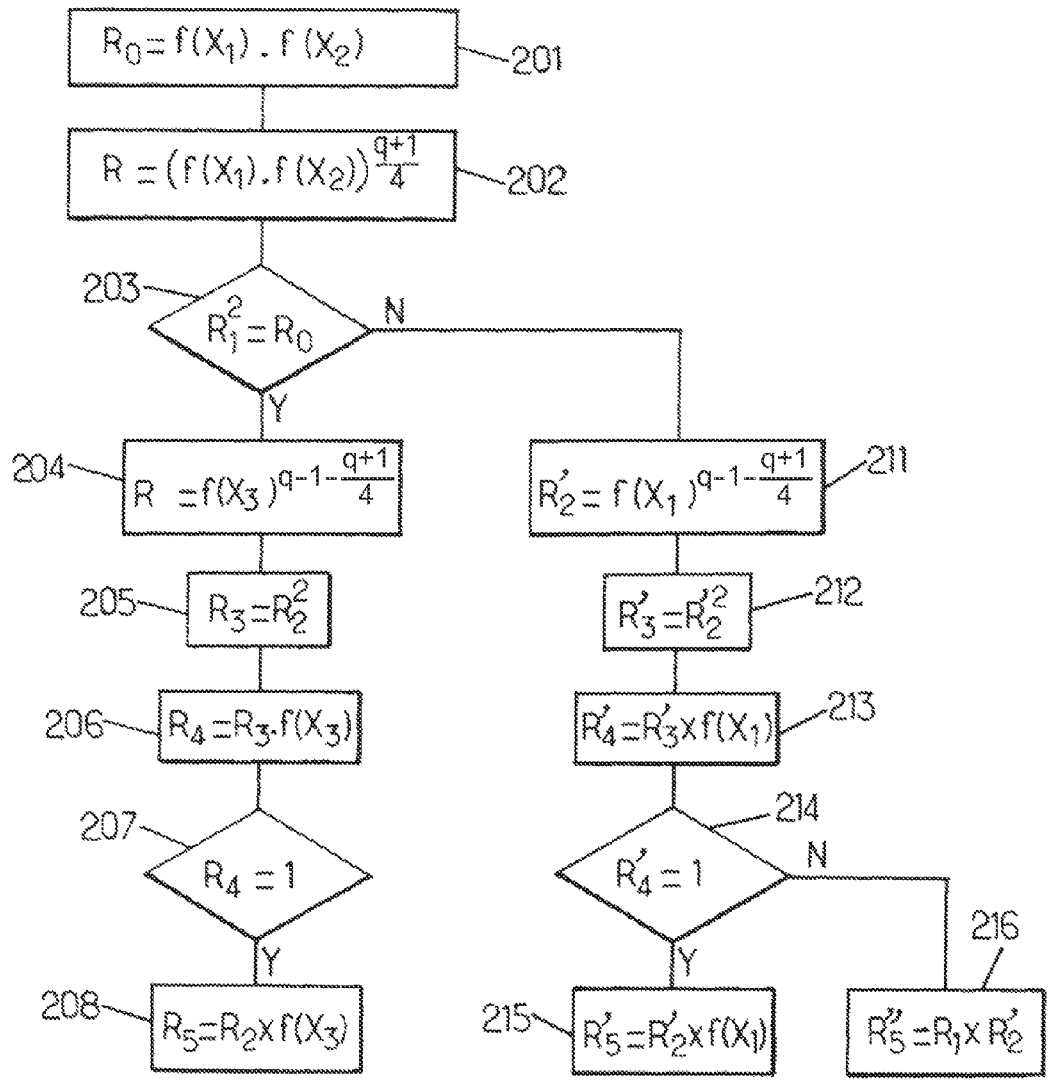
FIG. 2 shows a method of execution of a cryptographic calculation in detail according to one embodiment of the present invention.

FIG. 2 illustrates the implementation of a method of execution of a calculation according to one embodiment of the present invention.

In one embodiment of the present invention, at a step 201, the following multiplication is performed:

$$R_0 = f(X1) \cdot f(X2)$$

Then it is checked whether this term $R_0$ is a squared term by applying steps (iv) and (v). Thus, at a step 202, we calculate:

$$R_1 = R_0^{(q+1)/4} \quad \text{(iv)}$$

Then, at step 203, we determine whether the following equation is satisfied:

$$R_1^2 = R_0 \quad \text{(v)}$$

It is decided whether the term $R_0$, equal to $f(X_1) \cdot f(X_2)$, is a squared term or not. In the case where the term $R_0$ is a squared term, a test is applied with the aim of determining whether the term $f(X_3)$ is a squared term. The result of the latter test is known beforehand since if $R_0$ is a squared term, then this test is positive. However, for the purpose of ensuring a constant time, it is advisable to apply it according to steps (i) to (iii).

Thus, at a step 204, the following calculation is performed:

$$R_2 = f(X_3)^{(q-1-(q-1)/4)}$$

Here, $R_2$ corresponds to calculation of the reciprocal of the square root of $f(X_3)$, in the case when $f(X3)$ is a squared term.

Then, at a step 205, the following equation is calculated:

$$R_3 = R_2^2$$

Here, $R_3$ corresponds to the inverse of $f(X_3)$.

Then, at a step 206, $R_3$ is multiplied by the term $f(X_3)$, obtaining a term $R_4$. As we know that $f(X_3)$ is a squared term, we also know that the term $R_4$ is equal to 1. These steps 205 and 206 are employed in order to guarantee determination of a point P on the elliptical curve in a constant time.

At a step 207, it is therefore tested whether the term $R_4$ corresponds to 1. In the present case, this test is always positive, since it follows from test 203.

Then, at a step 208, the following calculation is performed:

$$R_5 = R_2 \cdot f(X_3)$$

Here, a point P on the curve is obtained which has $X_3$ as abscissa and, as ordinate, the square root of $f(X_3)$, i.e. the value $R_5$.

In the case when, at step 11, it is decided that the term $f(X_1) \cdot f(X_2)$ is not a squared term, then either the term $f(X_1)$ or the term $f(X_2)$ is a squared term.

Next it is a matter of determining which of these two terms $f(X_1)$ and $f(X_2)$ corresponds to a squared term.

For this purpose, operations similar to those described previously are carried out, except that in this case, the term $f(X_1)$ need not be a squared term.

At a step 211, the following equation is calculated:

$$R'_2 = f(X_1)^{q-1(q+1)/4}$$

In the case when $f(X_1)$ is a squared term, $R'_2$ corresponds to the value of the reciprocal of the square root of $f(X_1)$ as described for step (i). Then this last-mentioned term is squared, at a step 212:

$$R'_3 = R'_2{}^2$$

in order to obtain the inverse of $f(X_1)$ in the case when $f(X_1)$ would be a squared term.

Thus, on multiplying $R'_3$ by the term $f(X_1)$, we obtain $R'_4$ at a step 213, which has the value 1 if the term $f(X_1)$ is actually a squared term. In this case, the test carried out at a step 214, during which the term $R'_4$ is compared with the value 1, is positive.

Then, the following calculation is performed at a step 215:

$$R'_5 = R'_2 \cdot f(X_1)$$

The term $R'_5$ then corresponds to $f(X_1)$.

A point P on the curve is obtained with $X_1$ as abscissa and $R'_5$ as ordinate.

In the case when test 214 is negative, the term $f(X_1)$ is not a squared term. Then, it follows from this that the squared term in Skalba's equation (2) is the term $f(X_2)$. In this case, at a step 216, the following calculation is performed:

$$R''_5 = R_1 \cdot R'_2$$

It should be noted that the above equation makes it possible to obtain advantageously the square root of $f(X_2)$ but without carrying out an operation of exponentiation such as that carried out at step 204 or also at step 211. In fact, here it is, ingeniously, a matter of performing a multiplication instead of an exponentiation.

We then obtain R″$_5$, which corresponds to the term f(X$_2$), supplied at a step 216. Thus, a point P on the elliptical curve has been determined which has X$_2$ as abscissa and R″$_5$ as ordinate.

In the embodiment described previously with reference to FIG. 2, regardless of the determination of point P, i.e. whether this determination is based on the value X$_1$ or X$_2$ or X$_3$, similar calculations are employed, thus ensuring determination of a point on the elliptical curve in a constant time.

More precisely, two operations of exponentiation are employed, one exponentiation at step 202 and another exponentiation at step 204 or 211 depending on the result of test 203. Thus, it is no longer necessary to perform four exponentiations to determine a point on a curve in the context of Skalba polynomials in a constant time.

In one embodiment of the present invention, it is possible to select polynomials that satisfy Skalba's equality in such a way that the polynomial f(X$_3$(t)) can never correspond to a squared term whatever the value of t. In this case, Skalba's equation:

$$f(X_1(t)) \cdot f(X_2(t)) \cdot f(X_3(t)) = U^2(t) \qquad (2)$$

can be written in the form:

$$\left(f(X_1(t)) \cdot f(X_2(t)) \cdot f(X_3(t))\right)^{\frac{q+1}{4}} = (U(t)^2)^{\frac{q+1}{4}} = U(t)$$

then also in the form:

$$(f(X_1(t)) \cdot f(X_2(t)))^{\frac{q+1}{4}} = \frac{U(t)}{f(X_3(t))^{\frac{q+1}{4}}}$$

and also as:

$$(f(X_1(t)) \cdot f(X_2(t)))^{\frac{q+1}{4}} = U(t) \cdot \left(f(X_3(t))^{q-1-\frac{q+1}{4}}\right) \qquad (4)$$

All these equations are only valid if the condition q=3 mod 4 is satisfied. Now, if the term $$\left(f(X_3(t))^{q-1-\frac{q+1}{4}}\right)$$

of this last-mentioned equation corresponds to a set value, we are able to calculate the value of the term $$R_1 = (f(X_1) \cdot f(X_2))^{\frac{q+1}{4}}$$

efficiently using the multiplication $$U \cdot \left(f(X_3(t))^{q-1-\frac{q+1}{4}}\right).$$

In this case, a point on the elliptical curve can be determined using just one operation of exponentiation, that corresponding to step 204 of test 10, or that corresponding to step 211 of test 13, as appropriate.

These conditions can be fulfilled using for example a set of polynomials satisfying Skalba's equation as described in the document 'Rational points on certain hyperelliptic curves over finite fields' by Macie Ulas, dated 11 Jun. 2007. In this document, the polynomials satisfying Skalba's equation (2) are described:

$$X_1(t, u) = -\frac{b}{a}\left(1 + \frac{1}{t^4 f(u) + t^2 f(u)}\right)$$

$$X_2(t, u) = t^2 f(u) X_1(t, u)$$

$$X_3(t, u) = u$$

$$U(t, u) = t^3 f(u)^4 f(X_1(t, u))$$

where f(u)=u$^3$+au+b where a and b are elements of F$_q$ such that their product is not zero.

Thus, by determining a value of u that is set and that does not correspond to a squared term in F$_q$, the value of R$_1$ is then a set value that can be pre-calculated according to equation (4), for any determination of point P according to one embodiment of the present invention.

Figure 3:
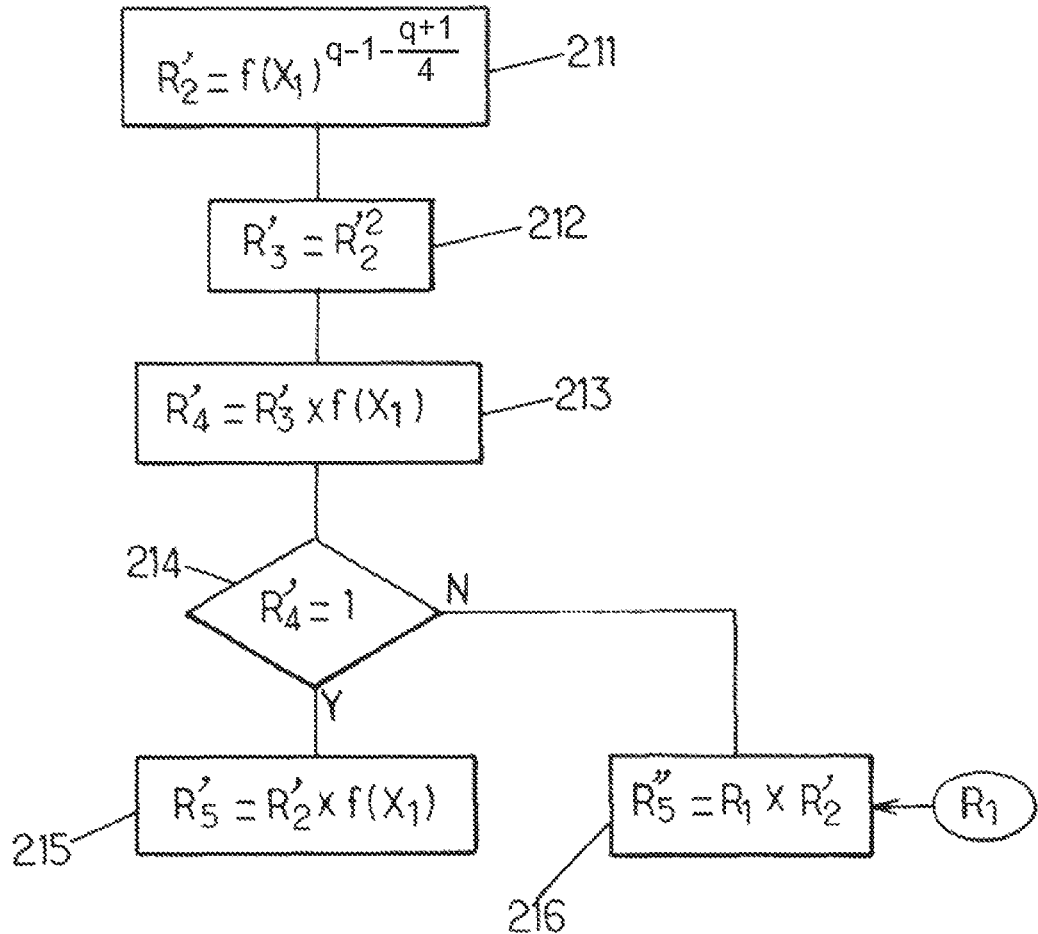
FIG. 3 shows a method of execution of a cryptographic calculation in detail according to one embodiment of the present invention in the particular case of Ulas polynomials.

FIG. 3 illustrates a method of execution of a cryptographic calculation in detail according to one embodiment of the present invention in the particular case of Ulas polynomials, for a set polynomial X$_3$(t,u) according to one embodiment of the present invention. In this case, steps 211 to 216 alone can be employed. If step 216 is executed, then the value R1 can be recovered from a memory area as it was calculated previously.

Accordingly, the number of exponentiations required for determining a point on the curve can be further reduced, to a single exponentiation, that which corresponds to test 10 or to test 13.

In one embodiment of the present invention, the use of Jacobian coordinates is advantageously envisaged. This transformation to Jacobian coordinates makes it possible to transform the operations of inversion into operations of multiplication which are quicker and easier to apply. It should be noted that such an embodiment cannot be applied to all curves of the Skalba type, including to the particular case of Ulas curves.

The equation of an elliptical curve:

$$X^3 + aX + b = Y^2$$

can be written in Jacobian coordinates:

$$X^3 + aX'Z^4 + bZ^6 = Y'^2$$

It should be noted that the coordinates of a point (X,Y) can be written in Jacobian coordinates (X',Y',Z') such that:

X'=X·Z$^2$ and

Y'=Y·Z$^3$

We should therefore determine a polynomial Z(t,u) in such a way that the Jacobian coordinates X', Y' and Z can be written without inversion.

In the following sections, this transformation into Jacobian coordinates is applied to a particular case, that of Ulas curves as described previously.

In this context, any operation of inversion is eliminated by taking:

$$Z(t,u)=a(t^4 f(u)^2+t^2 f(u))$$

in which u is set.

In fact, the Ulas polynomials can then be written in the following form in Jacobian coordinates:

$$X'_1(t,u)=-b \cdot Z(t,u)(t^4 f(u)^2+t^2 f(u)+1)$$

$$X'_2(t,u)=t^2 \cdot f(u) \cdot X'_1(t,u)$$

$$X'_3(t,u)=U$$

It should therefore be noted that there is no longer any inversion in Jacobian coordinates. As this operation can be as costly as an exponentiation, these coordinates permit a significant improvement in calculation time.

Then, to obtain the Jacobian coordinate Y', it is advisable to calculate U'(t,u), the equivalent of U(t,u) in Jacobian coordinates.

In this context, in classical coordinates we have:

$$U(t,u)^2=f(X_1(t,u)) \cdot f(X_2(t,u)) \cdot f(X_3(t,u))$$

We can then write in Jacobian coordinates:

$$U(t,u)^2=f(X'_1(t,u)/Z(t,u)^2) \cdot f(X'_2(t,u)/Z(t,u)^2) \cdot f(X'_3(t,u)/Z(t,u)^2)$$

By writing:

$$f_{Z(t)}(X') = X'^3 + a \cdot X' \cdot Z(t)^4 + b \cdot Z(t)^6 = Z^6 \cdot f\left(\frac{X}{Z^2}\right)$$

we obtain the following equation:

$$Z^{18}(t,u) \cdot U(t,u)^2=(Z(t,u)^9 \cdot U(t,u))^2=f_{Z(t,u)}(X'_1(t,u)) \cdot f_{Z(t,u)}(X'_2(t,u)) \cdot f_{Z(t,u)}(X'_3(t,u))$$

Then:

$$U'(t,u)=Z(t,u)^9 \cdot U(t,u)$$

where U'(t,u) is the expression of U(t,u) in Jacobian coordinates.

In the case where it is considered that U(t,u) satisfies the equation:

$$U(t,u)=t^3 \cdot f(u)^2 \cdot f(X_2(t,u))$$

we can then write:

$$U'(t,u)=t^3 \cdot f(u)^2 \cdot f_{Z(t,u)}(X'_2(t,u)) Z(t,u)^3$$

Skalba's equality becomes, in Jacobian coordinates:

$$U'(t,u)^2=f_{Z(t,u)}(X'_1(t,u)) \cdot f_{Z(t,u)}(X'_2(t,u)) \cdot f_{Z(t,u)}(X'_3(t,u))$$

Nevertheless, as in the case of Ulas polynomials it is possible to require that X'$_3$(t,u) is such that f$_{Z(t,u)}$(X'$_3$(t,u)) is never a square. In this case, we have:

$$U''(t,u)=t^3 \cdot f(u)^2 \cdot f_{Z(t,u)}(X'_2(t,u))$$

and the corresponding Skalba equality is:

$$U''(t,u)^2=f_{Z(t,u)}(X'_1(t,u)) \cdot f_{Z(t,u)}(X'_2(t,u)) \cdot f(X'_3(t,u))$$

The present invention can advantageously be implemented in any type of cryptographic calculation using elliptical curves. It can in particular be advantageous in protocols for authentication by password, such as PACE (Password Authenticated Connection Establishment). In this case, it allows an improvement in calculation performance, while not allowing any attack linked to the execution time of the cryptographic calculation.

The present invention can also be applied advantageously in the context of privacy protocols, such as those used for checking electronic identity documents, such as electronic passports.

The invention claimed is:

1. Method of execution of a cryptographic calculation in an electronic component comprising a step of obtaining a point P(X,Y) from at least one parameter t, on an elliptical curve satisfying the equation:

$$Y^2=f(X); \text{ and}$$

starting from polynomials $X_1(t)$, $X_2(t)$, $X_3(t)$ and $U(t)$ satisfying the following Skalba equality:

$$f(X_1(t)) \cdot f(X_2(t)) \cdot f(X_3(t))=U(t)^2$$

in the finite field $F_q$, regardless of the parameter t, q satisfying the equation q=3 mod 4;

said method comprising the following steps:

/1/ obtaining a value of the parameter t;

/2/ determining the point P by executing the following substeps:

/i/ calculating $X_1=X_1(t)$, $X_2=X_2(t)$, $X_3=X_3(t)$ and $U=U(t)$ and calculating a term $f(X_1) \cdot f(X_2)$;

/ii/ if the term $f(X_1) \cdot f(X_2)$ is a squared term in the finite field $F_q$ then testing whether the term $f(X_3)$ is a squared term in the finite field $F_q$ and calculating the square root of the term $f(X_3)$, point P having $X_3$ as abscissa and the square root of the term $f(X_3)$ as ordinate;

/iii/ otherwise, testing whether the term $f(X_1)$ is a squared term in the finite field $F_q$ and in this case, calculating the square root of the term $f(X_1)$, point P having $X_1$ as abscissa and the square root of the term $f(X_1)$ as ordinate;

/iv/ otherwise, calculating the square root of the term $f(X_2)$, point P having $X_2$ as abscissa and the square root of the term $f(X_2)$ as ordinate;

/3/ using said point P in a cryptographic application selected from the group consisting of encryption or hashing or signature or authentication or identification.

2. Method of execution of a cryptographic calculation according to claim 1, in which the following steps are executed at step /2/-/ii/:

calculating $R_1$ such that:

$$R_1 = (f(X_1) \cdot f(X_2))^{\frac{q+1}{4}}$$

if $R_1^2$ is equal to $f(X_1) \cdot f(X_2)$, then deciding whether the term $f(X_1) \cdot f(X_2)$ is a squared term in field $F_q$;

in which, at step /2/-/iii/, testing whether the term $f(X_1)$ is a squared term in the finite field $F_q$ according to the following steps:

calculating $R'_2$ such that:

$$R'_2 = f(X_1)^{q-1-\frac{q+1}{4}}$$

calculating $R'_3$ such that:

$$R'_3=R'_2{}^2$$

calculating $R'_4$ such that:

$$R'_4=R'_3 \cdot f(X_1)$$

in which, if $R'_4$ is not equal to 1, at step /2/-/iv/, obtaining the square root of $f(X_2)$ from the following equation:

$$\sqrt{f(X_2)} = R_1 \cdot R'_2.$$

3. Method of execution of a cryptographic calculation according to claim 1, in which the polynomials that satisfy Skalba's equality are expressed in Jacobian coordinates according to which the point P(X,Y) is written P(X',Y',Z) such that:

$$X' = X \cdot Z^2,$$

$$Y' = Y \cdot Z^3$$

where the function f is written $f_z(X')$ and satisfies:

$$f_z(X') = X'^3 + a \cdot X' \cdot Z^4 + b \cdot Z^6$$

with the elliptical curve satisfying the equation:

$$Y^2 = f_z(X')$$

in which the polynomials that satisfy Skalba's equality expressed in Jacobian coordinates are $X'_1(t)$, $X'_2(t)$, $X'_3(t)$, $Z(t)$ and $U'(t)$ and satisfy Skalba's equality in Jacobian coordinates:

$$U'(t)^2 = f_{Z(t)}(X'_1(t)) \cdot f_{Z(t)}(X'_2(t)) \cdot f_{Z(t)}(X'_3(t))$$

and in which Z(t) is determined in such a way that the operations of inversion are transformed into operations of multiplication.

4. Method of execution of a cryptographic calculation according to claim 1, in which the polynomials that satisfy Skalba's equality are such that it is possible to set the value of $X_3(t)$ for any possible t, such that $f(X_3(t))$ is never a squared term in $F_q$, and in which, at step /2/-/ii/, the term $f(X_1) \cdot f(X_2)$ is not a squared term in the finite field $F_q$, in which, at step /2/-/iii/, it is tested whether the term $f(X_1)$ is a squared term in the finite field $F_q$ according to the following steps:

calculating $R'_2$ such that:

$$R'_2 = f(X_1)^{q-1-\frac{q+1}{4}}$$

calculating $R'_3$ such that:

$$R'_3 = R'^2_2$$

calculating $R'_4$ such that:

$$R'_4 = R'_3 \cdot f(X_1)$$

in which, if $R'_4$ is not equal to 1, at step /2/-/iv/, obtaining the square root of $f(X_2)$ from the following equation:

$$\sqrt{f(X_2)} = R_1 \cdot R'_2$$

where $$R_1 = (f(X_1) \cdot f(X_2))^{\frac{q+1}{4}}$$

in which $R_1$ is obtained beforehand from the following equation:

$$R_1 = (f(X) \cdot f(X_2))^{\frac{q+1}{4}} = U \cdot f(u)^{q-1-\frac{q+1}{4}}.$$

5. Method of execution of a cryptographic calculation according to claim 4, in which the polynomials that satisfy Skalba's equality are expressed in Jacobian coordinates according to which the point P(X,Y) is written P(X',Y',Z) such that:

$$X' = X \cdot Z^2,$$

$$Y' = Y \cdot Z^3$$

where the function f is written $f_z(X')$ and satisfies:

$$f_z(X') = X'^3 + a \cdot X' \cdot Z^4 + b \cdot Z^6$$

with the elliptical curve satisfying the equation:

$$Y'^2 f_z(X'),$$

in which the polynomials that satisfy Skalba's equality expressed in Jacobian coordinates are $X'_1(t)$, $X'_2(t)$, $Z(t)$ and $U'(t)$ and satisfy Skalba's equality in Jacobian coordinates:

$$U'(t)^2 = f_{Z(t)}(X'_1(t)) \cdot f_{Z(t)}(X'_2(t)) \cdot f(X'_3(t))$$

and in which Z(t) is determined in such a way that the operations of inversion are transformed into operations of multiplication.

6. Method of execution of a cryptographic calculation according to claim 1, in which, at step /1/, the value of the parameter t is obtained as a function of a password or an identifier.

7. Method of execution of a cryptographic calculation according to claim 1, in which the cryptographic application is an application of authentication or identification by a checking entity, and in which, at step /1/, the following steps are executed:

/a/ generating a random value;

/b/ obtaining an encrypted value by encrypting said random value based on an encryption function using an encryption key determined from a password or identifier corresponding to the parameter; and /c/ transmitting the encrypted value to the checking entity.

8. A method for obtaining, with an electronic component, a point P(X,Y) on an elliptical curve satisfying the equation $Y^2 = f(X)$ and starting from polynomials $X_1(t)$, $X_2(t)$, $X_3(t)$ and U(t) satisfying the Skalba equality:

$$f(X_1(t)) \cdot f(X_2(t)) \cdot f(X_3(t)) = U(t)^2$$

in the finite field $F_q$ for any value of t, the method comprising:

(a) selecting a parameter t;

(b) calculating $X_1 = X_1(t)$, $X_2 = X_2(t)$ and $X_3 = X_3(t)$;

(c) calculating a term $f(X_1) \cdot f(X_2)$;

(d) determining if the term $f(X_1) \cdot f(X_2)$ is a squared term in the finite field $F_q$, if (d) is true, then:

(e1) testing whether the term $f(X_3)$ is a squared term in the finite field $F_q$, and (e2) calculating the square root of the term $f(X_3)$, and (e3) assigning point P with an abscissa equal to $X_3$ and an ordinate equal to the square root of the term $f(X_3)$.

if (d) is not true, then:

(f) testing whether the term $f(X_1)$ is a squared term in the finite field $F_q$, and if (f) is true, then:

(g1) calculating the square root of the term $f(X_1)$, and (g2) assigning point P with an abscissa equal to $X_1$ and an ordinate equal to the square root of the term $f(X_1)$.

if (f) is not true, then:

(h1) calculating the square root of the term $f(X_2)$, and (h2) assigning point P with an abscissa equal to $X_2$ and an ordinate equal to the square root of the term $f(X_2)$.

9. The method of claim 8, wherein the value of t is a function of a password or an identifier.

10. The method of claim 8, further comprising using said point P in a cryptographic application selected from the group consisting of encryption or hashing or signature or authentication or identification.

11. The method of claim 10, in which the cryptographic application is an application of authentication or identification by a checking entity, the method further comprising:
   generating a random value;
   obtaining an encrypted value by encrypting said random value based on an encryption function using an encryption key determined from a password or identifier corresponding to the value of t; and
   transmitting the encrypted value to the checking entity.

12. The method of claim 8, wherein the polynomials that satisfy Skalba's equality are expressed in Jacobian coordinates.

13. A method for obtaining, with an electronic component, a point $P(X,Y)$ on an elliptical curve satisfying the equation $Y^2=f(X)$ and starting from polynomials $X_1(t)$, $X_2(t)$, $X_3(t)$ and $U(t)$ satisfying the Skalba equality:

$$f(X_1(t)) \cdot f(X_2(t)) \cdot f(X_3(t)) = U(t)^2$$

in the finite field $F_q$ for any value of t, the method comprising choosing the polynomials that satisfy Skalba's equality such that the value of $X_3(t)$ for any value of t is such that $f(X_3(t))$ is never a squared term in $F_q$, the method further comprising:
   (a) selecting a parameter t;
   (b) calculating $X_1=X_1(t)$ and $X_2=X_2(t)$;
   (c) determining if the term $f(X_1)$ is a squared term in the finite field $F_q$,
   if (c) is true, then:
      (d1) calculating the square root of the term $f(X_1)$, and
      (d2) assigning point P with an abscissa equal to $X_1$ and an ordinate equal to the square root of the term $f(X_1)$
   if (c) is not true, then:
      (d3) calculating the square root of the term $f(X_2)$, and
      (d4) assigning point P with an abscissa equal to $X_2$ and an ordinate equal to the square root of the term $f(X_2)$.

* * * * *